United States Patent [19]

Nicolosi et al.

[11] Patent Number: 4,554,751

[45] Date of Patent: Nov. 26, 1985

[54] MULTI-FUNCTION VEHICULAR GEAR SHIFT LEVER FOR SNOWPLOW OPERATION

[76] Inventors: Carl T. Nicolosi, 191-B Beacon Hill Rd.; Thomas F. Nicolosi, 189-A Beacon Hill Rd., both of Morganville, N.J. 07751; Ryan D. McCreedy, 46 Tindall Rd., Middletown, N.J. 07748

[21] Appl. No.: 657,084

[22] Filed: Oct. 3, 1984

[51] Int. Cl.⁴ ............................................. E01H 5/04
[52] U.S. Cl. ..................................... 37/234; 74/471 R
[58] Field of Search ............. 37/234, 266, 124, 126 R, 37/129; 74/471 R, 473 R, 473 SW, 473 P, 879, 523; 200/61.28, 61.58, 61.88, 61.85, 158 H, 157, 52 A, 52 R

[56] References Cited

U.S. PATENT DOCUMENTS

| 1,709,619 | 4/1929 | Johnson | 200/61.28 |
| 1,931,775 | 10/1933 | Stafak | 200/61.28 |
| 3,131,574 | 5/1964 | Clingerman | 74/471 |
| 3,572,444 | 3/1971 | Scholl et al. | 37/266 |
| 3,589,242 | 6/1971 | Peterson et al. | 37/129 X |
| 3,897,805 | 8/1975 | Casey | 74/471 XY |
| 3,963,051 | 6/1976 | Kuhlmann | 74/471 R |
| 4,180,713 | 12/1979 | Gonzales | 200/52 R |
| 4,454,785 | 6/1984 | Purrer | 74/471 R |

FOREIGN PATENT DOCUMENTS 767769 9/1967 Canada ............................. 200/61.28

Primary Examiner—E. H. Eickholt
Attorney, Agent, or Firm—R. Gale Rhodes, Jr.

[57] ABSTRACT

Apparatus for providing control over both a transmission of a vehicle and an implement (e.g. a snow plow) mounted to that vehicle is disclosed. Specifically, this apparatus is comprised of both a lever, illustratively a shift lever, for choosing a pre-defined one of a plurality of gears in the transmission, and a selector mounted on the lever for causing the implement (snow plow) to perform a desired function (e.g. move in a desired direction). One end of the lever is adapted to be grasped by a driver of the vehicle. The selector is situated in sufficient proximity to this end so that the driver is not required to substantially release his grasp of this end of the lever in order to actuate the selector and evoke the desired function. As a result, the driver advantageously saves considerable time and effort in using a vehicular mounted implement and thus experiences far less fatigue than in the past.

4 Claims, 2 Drawing Figures

MULTI-FUNCTION VEHICULAR GEAR SHIFT LEVER FOR SNOWPLOW OPERATION

BACKGROUND OF THE INVENTION

1. Field of the Invention

The invention relates to apparatus for providing control over both a transmission of a vehicle and an implement, such as a snow plow, mounted on that vehicle.

2. Description of the Prior Art

Oftentimes, a plow, particularly a snow plow, is mounted on the front of a general purpose vehicle, such as a truck or tractor, and various driver actuated controls for raising, lowering and/or angling the plow are appropriately situated in the cab of the vehicle. To effectively plow an area, the driver faces the tasks of controlling both the movement of the vehicle and the position of the plow. Usually, to control the vehicle, the driver must maintain one hand on its steering wheel and the other on its transmission lever. Generally, the driver actuated plow controls, which typically comprise one or more levers, are usually mounted below or underneath the dashboard of the vehicle. Typically, to re-position the plow, the driver must first stop the vehicle, in order to take his hand off the transmission lever, and then lean down and appropriately operate the snow plow controls. Thereafter, the driver returns to his normal seated position to set the vehicle in motion. If a relatively large unobstructed area, such as a highway, is being plowed, then the tasks of controlling both the vehicle and the plow are relatively effortless. The driver firsts positions the plow and then starts the vehicle moving. In such a case, relatively little time is spent positioning the plow and the majority is spent controlling the movement of the vehicle. By contrast, these tasks become very time-consuming and fatiguing whenever relatively small or densely packed areas, such as residental streets or driveways, are to be plowed. Here, to avoid obstructions, the driver must constantly stop the vehicle, re-position the plow, and then restart the vehicle in motion. Unfortunately, in this situation, the driver wastes considerable time and is easily fatigued through excess repetitive efforts which entail stopping the vehicle, taking his hand off the transmission lever, bending down, operating the plow controls, returning to his normal driving position and then re-starting the vehicle in motion by shifting gears, steering and appropriately depressing the accelerator. It will be understood that with some prior art controls it is not always necessary to stop the vehicle to re-position the plow. Nonetheless, the driver must still take one hand off the gear shift or transmission lever to re-position the plow, and, if a change in gears is required while the plow is being re-positioned, this can not be readily accomplished with these prior art controls.

Various arrangements exist in the art to control the position of a plow. See, for example, that disclosed in U.S. Pat. Nos. 4,221,266 (issued to Fardal on Sept. 9, 1980); 4,026,048 (issued to Hill et al on May 31, 1977) and 3,585,319 (issued to Payerle on June 15, 1971). Other arrangements, typified by that disclosed in U.S. Pat. No. 3,941,009 (issued to Brown on Mar. 2, 1976), exist for shift levers to control vehicular transmissions. However, none of these arrangements minimizes the fatigue associated with operating a snow plow by eliminating the excess repetitive efforts required of a driver.

SUMMARY OF THE INVENTION

Accordingly, an object of the present invention is to provide apparatus for use in a vehicle in order to minimize the fatigue experienced by a driver and resulting from control of both the movement of the vehicle and the position of a vehicular mounted implement.

Another object is to provide such apparatus which minimizes the excess repetitive efforts required of a driver to control both the vehicle and the position of the implement.

A particular object is to provide such apparatus which minimizes the need for a driver to repetitively stop and re-start the vehicle, as well as eliminating the need for the driver to bend up and down to control the implement.

A more particular object is to provide such apparatus which eliminates the need for the driver to remove his hand from the transmission lever in order to control the implement.

These and other objects are accomplished in accordance with the present invention by a lever for choosing a pre-defined one of a plurality of gears in a vehicular transmission, wherein one end of the lever is adapted to be readily grasped by a driver of the vehicle, and a selector for evoking a vehicular mounted implement to perform a desired function, wherein the selector is attached to said lever and situated in sufficient proximity to the end of the lever so that the driver is not required to substantially release his grasp of the end of the lever in order to actuate the selector and thereby evoke the function.

In accordance with a preferred embodiment described herein, a number of switches are mounted to a collar which is, in turn, positioned on a vehicular gear shift lever and situated near the end of that lever that is to be grasped by the driver of the vehicle. Each of these switches, when actuated, supplies a signal to operate an hydraulic motor and/or to open an appropriate hydraulic valve in order to cause the implement, e.g. a snow plow, to move in a desired direction, e.g. up, down, left or right.

Through this apparatus, the driver never needs to take his hand off the transmission lever to re-position the implement. Thus, this eliminates not only the need to stop the vehicle to re-position the implement but also the need to bend down from a normal driving position. As a result, the driver advantageously saves considerable time and effort in using a vehicular mounted implement and thus experiences far less fatigue than in the past.

BRIEF DESCRIPTION OF THE DRAWING

The invention may be clearly understood from a consideration of the following detailed description taken in conjunction with the accompanying drawing, in which.

DETAILED DESCRIPTION

Figure 1:
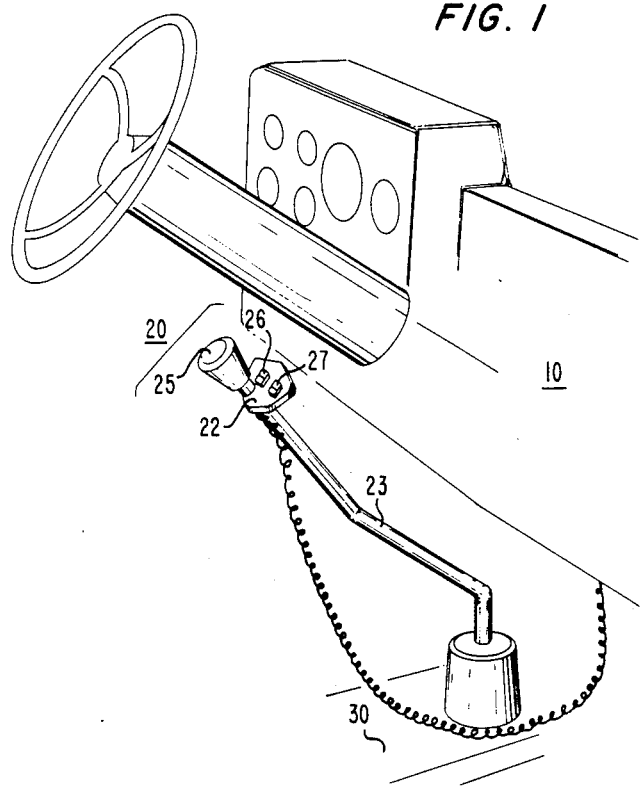
FIG. 1 is a sketch showing both a multi-function vehicular gear shift lever, embodying the teachings of the present invention, and its general placement within a cab of a vehicle.

As will be evident to anyone skilled in the art from reading the following detailed description, the teachings of the present invention are applicable to any vehicular implement as well as to any transmission lever, regardless of whether the lever is column or floor mounted within the cab of the vehicle. Hence, for the sake of brevity, the invention will be described in the context of a vehicle having a floor mounted transmission lever and an externally mounted electrically actuated and hydraulically driven snow plow. Also, to simplify the drawing, the hydraulic pump and none of the hydraulic valves and hydraulic cylinders is shown; however, it is readily apparent to anyone skilled in the art that any of a number of well-known and commercially available hydraulic pumps, valves and cylinders can be advantageously used in the preferred embodiment of the present invention.

FIG. 1 shows multi-function vehicular gear shift lever 20 (hereinafter referred to as lever 20) which embodies the teachings of the present invention and which advantageously can be used to simultaneously control both the transmission of the vehicle as well as the position of the snow plow. As shown, lever 20, which is mounted to the floor of vehicle 10 and particularly through transmission hump 30, is comprised of control rod 23, knob 25, collar 22 and switches 26 and 27. One end of control rod 23 is mechanically connected through a well-known linkage to the vehicle's transmission (not shown). Knob 25, mounted to the other end of the control rod, is appropriately sized to readily permit a driver's hand to grasp the knob and move the control rod, through a standard shift pattern, to choose any one of a number of available gears. Collar 22, on which switches 26 and 27 are mounted, is affixed to the control rod sufficiently close to knob 25 to permit the driver to easily change the settings of these switches without having to release the knob from his grasp. These switches, when depressed, energize various relays, as shown in detail in FIG. 2, which in turn route electrical power to a well-known electrically actuated hydraulic pump and/or to well-known electrically operated hydraulic valves to move the plow in a desired direction. In this manner, the driver can continuously grasp knob 25 with one hand in order to change gears as desired while simultaneously using the same hand to appropriately move the snow plow. As a result, the inventive apparatus greatly minimizes the effort required of a driver to control both a vehicle and an implement mounted thereon and thus significantly and advantageously lessens driver fatigue.

Figure 2:
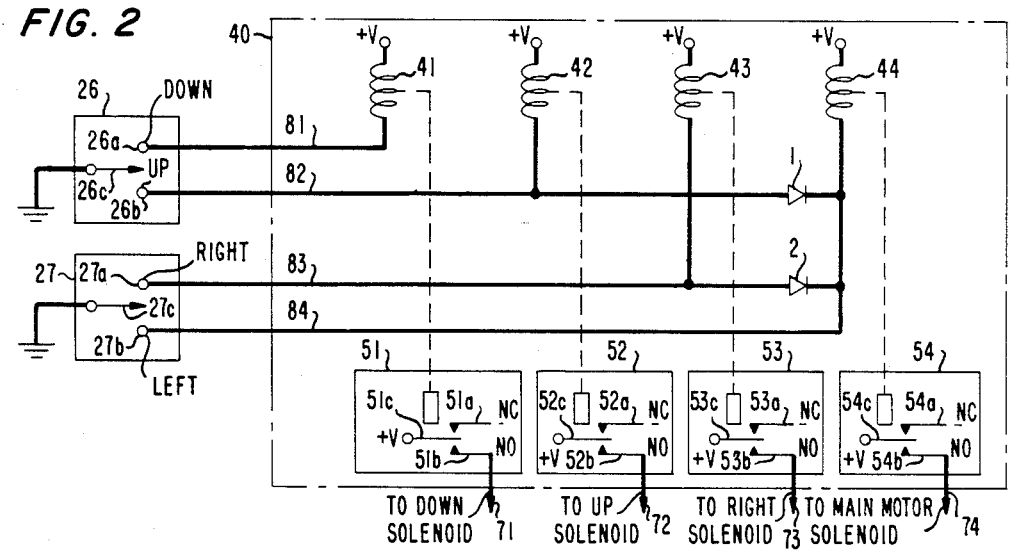
FIG. 2 is a schematic of an illustrative circuit, which is evoked by switches 26 and 27 which form part of the multi-function lever shown in FIG. 1, for causing the vehicular mounted implement to move in a desired direction.

A schematic of an illustrative circuit connected to switches 26 and 27, for controlling the movement of the snow plow, is shown in FIG. 2. This circuit is primarily comprised of relay coils 41, 42, 43 and 44, and corresponding relay contacts 51, 52, 53 and 54. Specifically, switch 26 is preferably a combination momentary off—lock rocker switch with a center off position and switch 27 is preferably a momentary rocker switch with a center off position. Switch 26 controls the elevational (up/down) movement of the plow; while switch 27 controls lateral (right/left) movement of the plow. For example, if that portion of switch 26 which evokes "up" movement is depressed, then armature 26c grounds normally open contact 26b which, in turn, grounds one end of relay coil 42, via lead 82. As a result, relay coil 42 energizes and thus moves its armature 52c to contact normally open contact 52b. This, in turn, applies power, via lead 72, to operate the "up" solenoid and actuate an appropriate well-known (up) hydraulic valve. Simultaneously therewith, relay 44 also energizes—the latter through the diode 1, and thus—through armature 54c, contact 54b and lead 74—energizes the main motor solenoid (not shown) which, in turn, actuates the hydraulic pump. Consequently, hydraulic fluid is routed under pressure to a well-known (up/down) hydraulic cylinder and moves the plow up. "Down" movement of the plow is accomplished merely by moving the armature of switch 26 in the opposite direction to energize relay 41 which, in turn—through armature 51c, contact 51b and lead 71—actuates a second well-known (down) hydraulic valve to vent the fluid from the up/down hydraulic cylinder and allow the plow to move downward under its own weight. To move the plow to the right, the appropriate portion of switch 27 is depressed. This, in turn, via grounded contact 27a and lead 83, energizes both relay coils 43 and 44—the latter via diode 2—to operate—via armatures 53c and 54c, contacts 53b and 54b, and leads 73 and 74—both of the "right" and "main motor" solenoids. These operations actuate a third well-known (right) hydraulic valve and route hydraulic fluid under pressure to another well-known (right/left) hydraulic cylinder and thus cause the plow to move in the "right" direction. To move the plow in the "left" direction, armature 27c of switch 27 is moved in an opposite direction in order to ground contact 27b, which through lead 84, energizes relay 44. As a result, armature 54c applies power through contact 54b and lead 74 to energize the main motor solenoid and actuate the hydraulic pump. Inasmuch as normal (rest) position of the right hydraulic valve is such as to route hydraulic fluid under pressure to the left/right cylinder to move the plow in the left direction, none of the hydraulic valves must be actuated to move the plow in the left direction.

Clearly, the relays can be replaced with appropriate semiconductor switching devices. Also, the snow plow can be replaced with any one of a variety of implements. Rather than controlling just the lateral and elevational movement of the implement, it is readily within the skill in the art to modify the circuit such that it provides control over any number of different functions required by the particular implement mounted to the vehicle.

Hence, many varied arrangements can be made by those skilled in the art without departing from the spirit and scope of the invention.

We claim:

1. Apparatus for substantially simultaneously controlling both a transmission of a vehicle to change the forward and reverse directions of movement of the vehicle, and lateral and/or elevational movement of a snow plow mounted to the vehicle, said apparatus comprising:

a lever for choosing a pre-defined one of a plurality of gears in said transmission to change the forward and reverse directions of movement of the vehicle, wherein one end of said lever is adapted to be grasped by a single hand of a driver of said vehicle, and a selector for controlling the movement of said snow plow, wherein said selector is attached to said lever and situated in sufficient proximity to the end of the lever so that the driver is not required to substantially release the grasp of said single hand from the end of the lever in order to actuate said selector and thereby cause the snow plow to move in a desired direction.

2. The apparatus in claim 1 wherein the selector is comprised of at least two switches, wherein one switch controls lateral movement and the other switch controls elevational movement of the snow plow.

3. The apparatus in claim 2 wherein the selector is further comprised of a collar which is fixedly attached to said lever and to which both of said switches are mounted.

4. Apparatus for substantially simultaneously controlling both a transmission of a vehicle to change the forward and reverse directions of movement of the vehicle, and lateral and elevational movement of a snow plow mounted to the vehicle, said apparatus comprising:

a lever for choosing a pre-defined one of a plurality of gears in said transmission to change the forward and reverse directions of movement of the vehicle, wherein one end of said lever is adapted to be grasped by a single hand of a driver of said vehicle, and a selector for controlling the movement of said snow plow, wherein said selector is comprised of a collar which is fixedly attached to said lever and to which one switch for controlling the lateral movement and another switch for controlling the elevational movement are both attached, and wherein said collar is fixedly attached to said lever and situated in sufficient proximity to the end of the lever so that the driver is not required to substantially release the grasp of said single hand from the lever in order to actuate said selector and thereby cause the snow plow to move in a desired direction.

* * * * *

Notice of Adverse Decision in Interference

In Interference No. 101,646, involving Patent No. 4,554,751, C. T. Nicolosi, T. F. Nicolosi and R. D. McCreedy, MULTI-FUNCTION VEHICULAR GEAR SHIFT LEVER FOR SNOWPLOW OPERATION, final judgment adverse to the patentees was rendered Oct. 25, 1988, as to claims 1 - 4.
[*Official Gazette February 14, 1989.*]